United States Patent
Bos et al.

(10) Patent No.: US 11,206,130 B2
(45) Date of Patent: Dec. 21, 2021

(54) CUSTOMIZING CRYPTOGRAPHIC KEYS BETWEEN MULTIPLE HOSTS

(71) Applicant: NXP B.V., Eindhoven (NL)

(72) Inventors: Joppe Willem Bos, Wijgmaal (BE);
Rudi Verslegers, Genk (BE);
Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 165 days.

(21) Appl. No.: 16/050,350

(22) Filed: Jul. 31, 2018

(65) Prior Publication Data

US 2020/0044837 A1 Feb. 6, 2020

(51) Int. Cl.
| | |
|---|---|
| *H04L 9/08* | (2006.01) |
| *H04L 9/00* | (2006.01) |
| *H04L 9/06* | (2006.01) |
| *H04L 9/14* | (2006.01) |
| *H04L 9/32* | (2006.01) |

(52) U.S. Cl.
CPC ............ *H04L 9/0861* (2013.01); *H04L 9/008* (2013.01); *H04L 9/0618* (2013.01); *H04L 9/14* (2013.01); *H04L 9/3242* (2013.01); *H04L 2209/16* (2013.01)

(58) Field of Classification Search
None
See application file for complete search history.

(56) References Cited

U.S. PATENT DOCUMENTS

| | | | |
|---|---|---|---|
| 8,799,646 B1 * | 8/2014 | Pei ................... | H04L 63/08 713/155 |
| 10,153,897 B1 * | 12/2018 | Jezewski ............... | H04L 9/3013 |
| 10,511,436 B1 * | 12/2019 | Machani .................. | H04L 9/30 |
| 10,812,269 B2 * | 10/2020 | Medvinsky .......... | H04L 9/0631 |
| 10,855,440 B1 * | 12/2020 | Alwen ..................... | H04L 9/00 |
| 10,985,905 B2 * | 4/2021 | Anderson .............. | H04L 9/302 |
| 11,032,075 B2 * | 6/2021 | Le Saint ................. | H04L 9/14 |
| 11,048,572 B2 * | 6/2021 | Cardoso .............. | G06F 11/0709 |
| 11,063,743 B2 * | 7/2021 | Gouget .................. | H04L 9/002 |
| 2006/0140401 A1 | 6/2006 | Johnson et al. | |
| 2012/0042170 A1 * | 2/2012 | Curtin ................... | H04L 9/0841 713/185 |

(Continued)

FOREIGN PATENT DOCUMENTS

EP 3264316 A1 1/2018

OTHER PUBLICATIONS

Kolegov et al., "GitHub—tsu-iscd/jcrypto", Github, Nov. 21, 2017, retrieved from the internet at https://github.com/tsu-iscd/jcrypto on Dec. 12, 2019, 3 pages.

(Continued)

*Primary Examiner* — Michael W Chao

(57) ABSTRACT

Various embodiments relate to a method of generating a shared secret for use in a symmetric cipher, including: receiving, by a processor, an encoded key Enc(K) and a white-box implementation of the symmetric cipher, where the encoded key Enc(K) is used in the white-box implementation; selecting, by the processor, homomorphic functions $\odot$ and $\otimes$ and the values $c_1$ and $c_3$ such that $Enc(K) \odot c_1 = Enc(K \otimes c_3)$; and transmitting, by the processor, $\otimes$ and $c_3$ to another device.

5 Claims, 3 Drawing Sheets

(56) References Cited

U.S. PATENT DOCUMENTS

| | | | |
|---|---|---|---|
| 2013/0014274 A1* | 1/2013 | Goodes | G06F 21/6209 726/26 |
| 2013/0047264 A1* | 2/2013 | Bjorkengren | G06F 21/105 726/27 |
| 2014/0006803 A1* | 1/2014 | Bodis | G06F 21/51 713/189 |
| 2014/0040605 A1* | 2/2014 | Futral | G06F 21/572 713/2 |
| 2016/0065370 A1* | 3/2016 | Saint | H04L 9/0841 713/155 |
| 2016/0099814 A1* | 4/2016 | Negi | H04L 9/3268 713/171 |
| 2016/0218875 A1* | 7/2016 | Saint | H04L 63/045 |
| 2017/0063975 A1* | 3/2017 | Prakash | G06F 21/44 |
| 2017/0085383 A1* | 3/2017 | Rao | G06F 8/654 |
| 2017/0294148 A1* | 10/2017 | Isobe | H04L 9/002 |
| 2017/0373828 A1* | 12/2017 | Michiels | G06F 21/75 |
| 2018/0181947 A1* | 6/2018 | Roberts | G06Q 20/3227 |
| 2019/0005229 A1* | 1/2019 | Hlaing | G06F 21/554 |
| 2019/0109848 A1* | 4/2019 | Clark | H04L 63/1441 |
| 2019/0140834 A1* | 5/2019 | Medvinsky | H04L 9/3242 |
| 2019/0182046 A1* | 6/2019 | Rangaraj | H04L 9/0618 |
| 2019/0356529 A1* | 11/2019 | Gulati | H04L 9/3268 |
| 2019/0372759 A1* | 12/2019 | Rix | H04L 9/0838 |
| 2020/0021441 A1* | 1/2020 | Le Saint | H04L 9/0822 |
| 2020/0065480 A1* | 2/2020 | Gu | G06F 21/51 |
| 2020/0213111 A1* | 7/2020 | Leavy | H04L 63/061 |
| 2021/0056546 A1* | 2/2021 | Murray | H04L 9/002 |
| 2021/0058259 A1* | 2/2021 | Le Saint | H04L 9/14 |
| 2021/0194681 A1* | 6/2021 | Nix | H04L 9/3013 |

OTHER PUBLICATIONS

Muir, James A., "A Tutorial on White-box AES", IACR Cryptology ePrint Archive, Feb. 28, 2013, pp. 1-25, vol. 20130228:053134, International Association for Cryptologic Research, https://eprint.lacr.org/.

S. Chow, et al. "White-box cryptography and an AES implementation" Selected Areas in Cryptography—Lecture Notes in Computer Sci., vol. 2595, pp. 250-270. (2003).

S. Chow, et al. "A white-box DES implementation for DRM applications" Digital Rights Management—DRM 2002, Lecture Notes in Computer Sci., vol. 2696, pp. 1-15. (2003).

* cited by examiner

CUSTOMIZING CRYPTOGRAPHIC KEYS BETWEEN MULTIPLE HOSTS

TECHNICAL FIELD

Various exemplary embodiments disclosed herein relate generally to customizing cryptographic keys between multiple hosts.

BACKGROUND

It is often the case that two entities need to securely communicate with each other using a pre-shared symmetric key. This pre-shared key is loaded or transferred in some form to the two parties at initialization time. This means that the provisioner or both provisioners (e.g., an original equipment manufacturer), if these are different parties, know the value of the pre-shared key used.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of generating a shared secret for use in a symmetric cipher, including: receiving, by a processor, an encoded key Enc(K) and a white-box implementation of the symmetric cipher, where the encoded key Enc(K) is used in the white-box implementation; selecting, by the processor, homomorphic functions $\odot$ and $\otimes$ and the values $c_1$ and $c_3$ such that $Enc(K) \odot c_1 = Enc(K \otimes c_3)$; and transmitting, by the processor, $\otimes$ and $c_3$ to another device.

Various embodiments are described, wherein the shared secret is $K \otimes c_3$.

Various embodiments are described, wherein the encoding is $Enc(x) = x^e \mod n$, where n is the product of two prime number; $\odot(Enc(K), c_1) = Enc(K) \cdot Enc(c_1)$; and $\otimes(K, c_3) = K \cdot c_3$.

Various embodiments are described, wherein the encoded key Enc(K) and the white-box implementation of the symmetric cipher is received from an original equipment manufacturer.

Various embodiments are described, wherein the encoded key Enc(K) and the white-box implementation of the symmetric cipher is produced by a white-box service that receives an unencoded copy of the key K.

Various embodiments are described, further including: encrypting data, by the processor, using the shared secret and the white-box implementation; and transmitting, by the processor, the encrypted data to the other device.

Various embodiments are described, wherein the other device is a secure element.

Further various embodiments relate to a method of generating a shared secret for use in a symmetric cipher, including: randomly selecting, by the processor, a valued $c_3$; receiving, by a processor, an encoded key Enc(K), a white-box implementation of the symmetric cipher, and a white-box implementation of a function $f(K, c_3)$ where the encoded key Enc(K) is used in the white-box implementation; calculating the shared secret K' as $K' = f(K, c_3)$; and transmitting, by the processor, $c_3$ to another device.

Various embodiments are described, wherein the other device is a secure element.

Various embodiments are described, wherein the function $f(K, c_3)$ is a hash function.

Various embodiments are described, further including: encrypting data, by the processor, using the shared secret and the white-box implementation; and transmitting, by the processor, the encrypted data to the other device.

Various embodiments are described, wherein the encoded key Enc(K), the white-box implementation of the symmetric cipher, and a white-box implementation of a function $f(K, c_3)$ is received from an original equipment manufacturer.

Various embodiments are described, wherein the encoded key Enc(K), the white-box implementation of the symmetric cipher, and a white-box implementation of a function $f(K, c_3)$ is produced by a white-box service that receives an unencoded copy of the key K.

Further various embodiments relate to a method of generating a shared secret for use in a symmetric cipher, including: receiving, by the processor, a value $c_3$ from another device; receiving, by a processor, an encoded key Enc(K), a white-box implementation of the symmetric cipher, and a white-box implementation of a function $f(K, c_3)$ where the encoded key Enc(K) is used in the white-box implementation; and calculating the shared secret K' as $K' = f(K, c_3)$.

Various embodiments are described, wherein the other device is a secure element.

Various embodiments are described, wherein the function $f(K, c_3)$ is a hash function.

Various embodiments are described, wherein further including: encrypting data, by the processor, using the shared secret and the white-box implementation; and transmitting, by the processor, the encrypted data to the other device.

Various embodiments are described, wherein the encoded key Enc(K), the white-box implementation of the symmetric cipher, and a white-box implementation of a function $f(K, c_3)$ is received from an original equipment manufacturer.

Various embodiments are described, wherein the encoded key Enc(K), the white-box implementation of the symmetric cipher, and a white-box implementation of a function $f(K, c_3)$ is produced by a white-box service that receives an unencoded copy of the key K.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
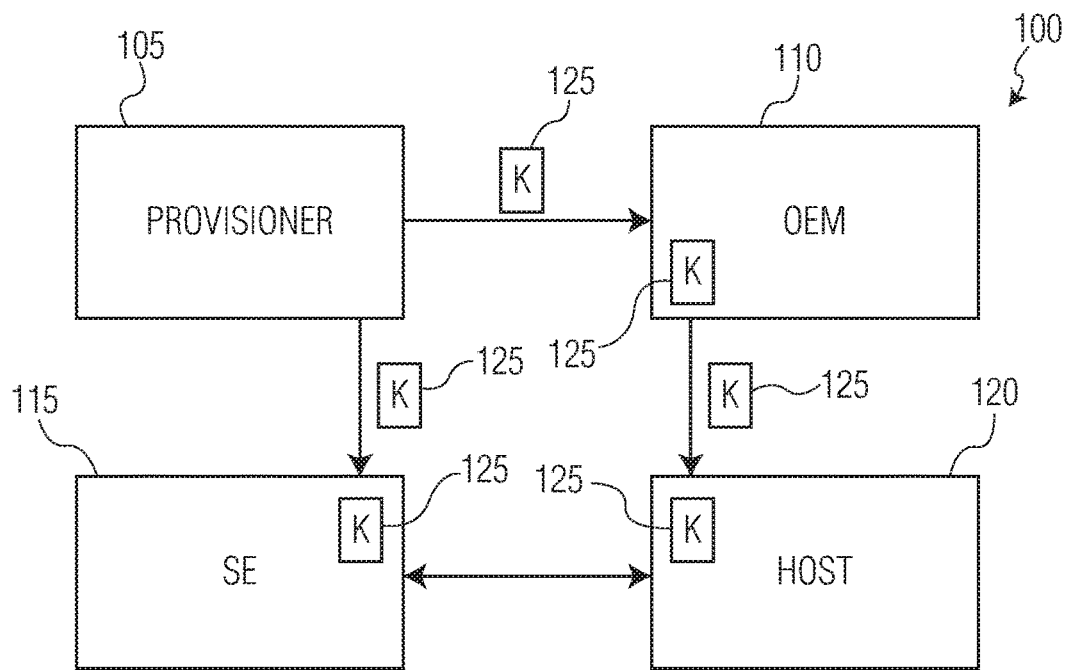
FIG. 1 illustrates a typical scenario where no encodings are used.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

It is often the case that two entities need to securely communicate with each other using a pre-shared symmetric key. This disclosure describes how the two entities may modify this pre-shared key in such a way that neither an adversary nor an original provisioner of the pre-shared key know the modified value of these shared keys.

White-box cryptography is aimed at protecting secret keys from being disclosed in a software implementation. See for example: Stanley Chow, Philip A. Eisen, Harold Johnson, and Paul C. van Oorschot, White-box cryptography and an AES implementation, Selected Areas in Cryptography—SAC 2002 (Kaisa Nyberg and Howard M. Heys, eds.), Lecture Notes in Computer Science, vol. 2595, Springer, 2003, pp. 250-270; and Stanley Chow, Philip A. Eisen, Harold Johnson, and Paul C. van Oorschot, A white-box DES implementation for DRM applications, Digital Rights Management—DRM 2002 (Joan Feigenbaum, ed.), Lecture Notes in Computer Science, vol. 2696, Springer, 2003, pp. 1-15. These articles disclose white-box implementations of the advanced encryption standard (AES) and data encryption standard (DES) encryption methods. In such a context, it is assumed that the attacker (usually a "legitimate" user or malicious software) may also control the execution environment of the white-box implementation. This is in contrast with the more traditional security model where the attacker is only given a black-box access (i.e., inputs/outputs) to the cryptographic algorithm under consideration.

The main idea of white-box implementations is to rewrite a key-instantiated version so that all information related to the key is "hidden". In other words, for each secret key, a key-customized software is implemented so that the key input is unnecessary.

Most symmetric block-ciphers, including the AES and the DES, are implemented using substitution boxes and linear transformations. Imagine that such a cipher is white-box implemented as a huge lookup table taking as an input any plaintext and returning the corresponding ciphertext for a given key. Observe that this white-box implementation has exactly the same security as the same cipher in the black-box context: the adversary learns nothing more than pairs of matching plaintexts/ciphertexts. Typical plaintexts being 64-bit or 128-bit values, such an ideal approach cannot be implemented in practice.

Current white-box implementations (as described for example in Chow) apply the above basic idea to smaller components. They represent each component of the cryptographic function as a series of lookup tables and insert random input and output bijective encodings on the lookup tables to introduce ambiguity, so that the resulting algorithm appears as the composition of a series of lookup tables with randomized values.

When two entities want to securely communicate with each other, there are many ways to accomplish this. When the usage of public-key cryptography is too computationally expensive, or the public-key infrastructure is not present, then one could use pre-shared symmetric cryptographic keys to secure the communication between these two parties.

These keys are typically put into devices owned by the parties communicating (i.e., provisioned) at initialization time. This means that the provisioner of each entity, which could be one party or two different parties, knows the value of this pre-shared key. It might be desirable to change the value of these pre-shared keys in order to increase the security of the communication between the two entities holding these pre-shared keys.

Assume an encoding function Enc: $\mathbb{K} \to \mathbb{E}$ where $\mathbb{K}$ is the key space of the symmetric cipher used and $\mathbb{E}$ is the co-domain for this specific encoding. A key K is not transferred in the clear, but instead in an encoded form Enc(K). Hence, the first entity receives $Enc_1(K)$ and the second one $Enc_2(K)$. $Enc_1$ and $Enc_2$ are two different instances of the encoding functions introduced above. In order to modify the keys so that resulting modified key is the same for each entity, the encoding scheme needs to be homomorphic. More precisely, it is required that $$Enc_1(K) \odot c_1 = Enc_2(K) \oplus c_2 = Enc_1(K \otimes c_3) = Enc_2(K \otimes c_3)$$

for some operations $\odot$ and $\oplus$ on the encodings and $\otimes$ on the keys and some constants $c_1$, $c_2$, $c_3$.

After the encoded keys have been provisioned one of the two entities starts a modification procedure. This modification of the key may be done by one of the two parties, using external or internal information (or a mixture) or this modification may be a joint process (a negotiation) between the two entities. For example, one entity generates, based on internal or external data, this value $c_1$ and derives from this the value $c_3$ and $c_2$. For this latter value it is assumed the entity knows the encoding function $Enc_2$ used by the other entity. It communicates the value $c_2$ in a secure manner and both entities may optionally verify that they have the same correct updates shared key $K \otimes c_3$.

Now a concrete example will be described starting with a typical scenario where no encodings are used. FIG. 1 illustrates a typical scenario where no encodings are used. A system 100 may include a provisioner 105, an original equipment manufacturer (OEM) 110, a secure element (SE) 115, and a host 120. Assume the first entity is the host 120 which may include an unprotected processor, and the host 120 may serve as a host processor for the system 100. Next, the provisioner 105 generates a cryptographic symmetric key K 125 which is provisioned into a SE 115. The SE is any secure hardware that allows for the secure storage of data and resists tampering and attacks. Further, the SE may include processing that allows for the secure processing of secure data that resists tampering and attacks. This SE 115 may be integrated into some target platform where the host 120, receives this same key from the OEM 110, which in turn received this key from the provisioner 105. The arrows between the SE 115 and the host 120 indicate the usage of the cryptographic keys for encrypted communication between the SE 115 and the host 120.

In this setting the key K 125 is stored unprotected on the host 120. Hence, an adversary could simply copy or read this key after acquiring access to the system 100. This significantly reduces the security offered by the SE 115.

Figure 2:
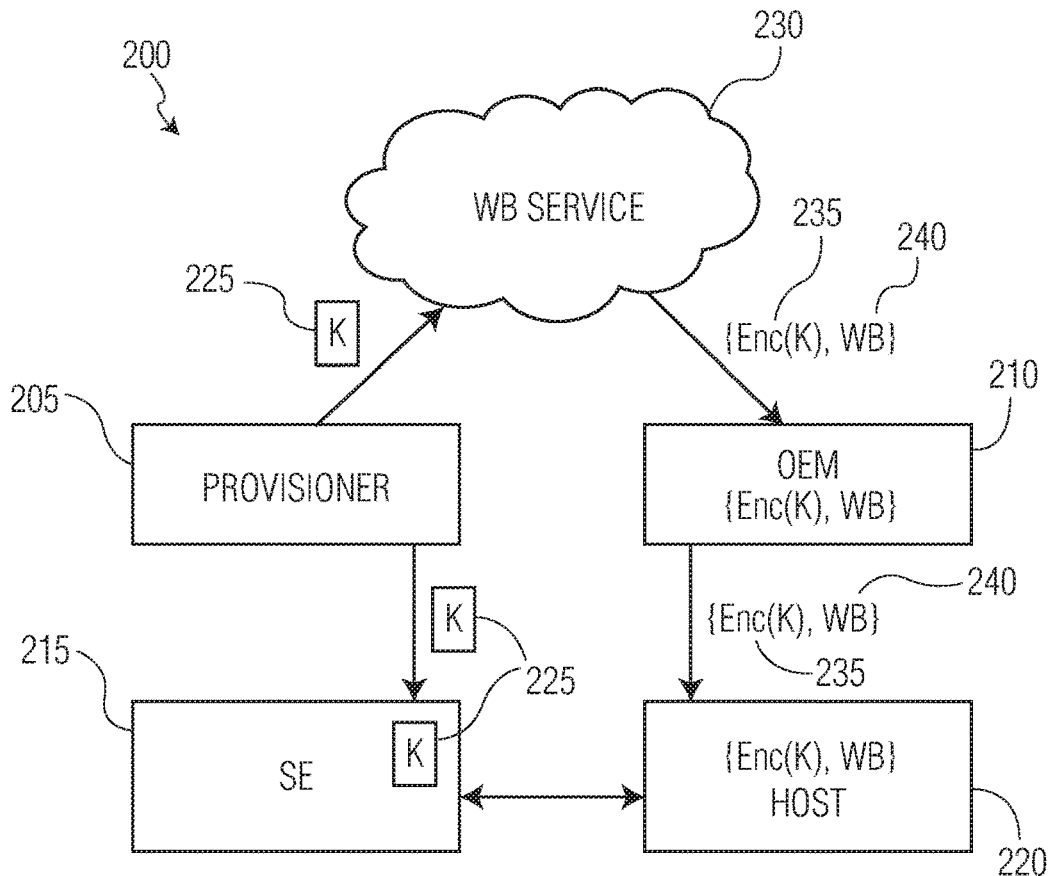
FIG. 2 illustrates a system that protects the cryptographic key.

FIG. 2 illustrates a system that protects the cryptographic key. The system 200 is similar to the system 100 in FIG. 1, but adds a white-box service 230. One possible solution to protect the cryptographic key 225 on the host 220 is to use a white-box implementation WB 240 which uses an encoding of the key K 225 (denoted Enc(K) 235) for use with this white-box implementation 240. A symmetric cipher Cipher may be defined as:

$$\text{Cipher}_K(x) = \text{WB}_{Enc(K)}(X).$$

In this system 200 the provisioner 205 still loads the cryptographic key K 225 into the SE 215 but also provides this key 225 to a white-box service 230, which the provisioner 205 may implement or outsource to another (as a cloud service, for example), which generates the white-box implementation 240 and the encoded key 235 for the OEM 210. The OEM 210 loads the white-box implementation 240 and the encoded key 235 into the host 220.

Because the second entity is using a tamper resistant piece of hardware, i.e., the SE 215, no encoding is used. Hence, the encoding function on the key 225 in the SE is the identity function. The host 220 selects a function $\odot$ and a constant $c_1$ such that it allows for the homomorphic computation:

$$Enc(K) \odot c_1 = Enc(K \otimes c_3).$$

Figure 3:
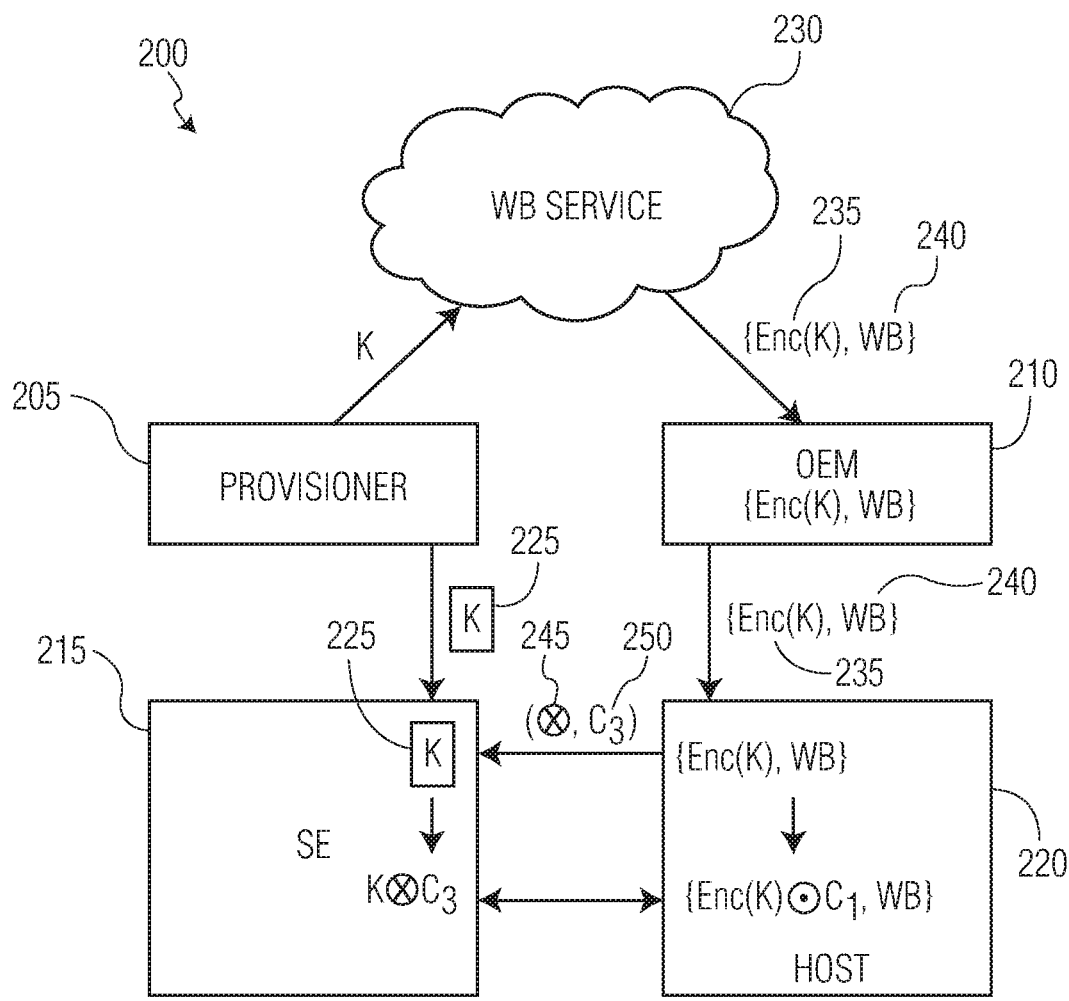
FIG. 3 illustrates the system of FIG. 2 showing how a homomorphic computation is used by the system.

FIG. 3 illustrates the system 200 showing how this homomorphic computation is used by the system. Once the functions $\odot$ and $\otimes$ and the values $c_1$ and $c_3$ have been selected and computed, the pair $(\otimes, c_3)$ 245 and 250 is transmitted to the SE 215, which simply applies this function $\otimes c_3$ to the stored key K 225. In order to protect this modification, the pair $(\otimes, c_3)$ 245 and 250 could be encrypted with the current value of the key K.

An example of homomorphic encoding that may be used is unpadded RSA. Let n be the public RSA modulus and e the public exponent. Then the encoding Enc is $Enc(x)=x^e \mod n$, which is the unpadded RSA encryption. This is a homomorphic operation. Recall that the following relationship must be satisfied:

$$Enc(K) \odot c_1 = Enc(K \otimes c_3).$$

The two functions may be defined as follows:

$$\odot(Enc(K), c_1) = Enc(K) \cdot Enc(c_1); \text{ and}$$

$$\otimes(K, c_3) = K \cdot c_3.$$

When $c_1 = c_3$ is chosen at random then:

$$\odot(Enc(K), c_1) = Enc(K) \cdot Enc(c_1) =$$
$$K^e \cdot c_1^e \mod n = (K \cdot c_1)^e \mod n = Enc(K \cdot c_1) = Enc(\otimes(K, c_3))$$

Hence, unpadded RSA is homomorphic and can be used as an encoding function in this scenario.

Another method of computing this shared modification of the key is the following. Instead of requiring that the encoding scheme is homomorphic, the SE 215 may compute $f(K, c_3) = K'$ as the new key using some function $f$ (an example is a cryptographic hash function). The value $c_3$ is randomly generated shared with the other party. The other party, knowing the function $f$, may compute $f'(K, c_3) = Enc(K')$ where $f'$ is a white-boxed version of $f$ which outputs an encoded version of $K'$. The encoded version of $K'$ may sent to the WB service 230 to be used as input to produce the white-box implementation of the cipher. Alternatively, the other party may randomly select $c_3$ and share it with the SE.

The embodiments describe herein provide a technological solution to the problem of having a shared secret between to entities knows by others such as OEMs and provisioners.

The embodiments described herein provide methods to produce a shared secret that is not known by others such as the OEMs and provisioners.

Figure 4:
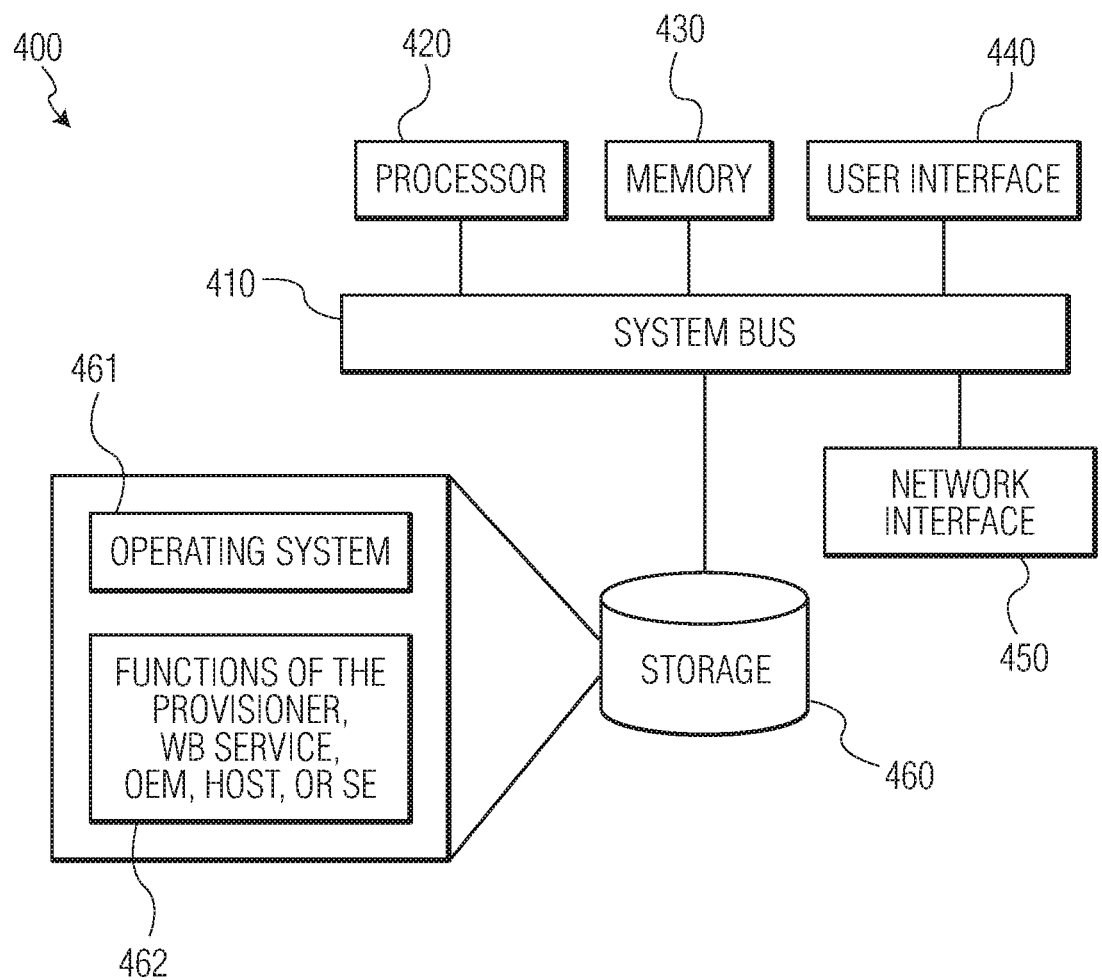
FIG. 4 illustrates an exemplary hardware diagram 400 for implementing the white-box service, provisioner, original equipment manufacturer, host, and secure element.

FIG. 4 illustrates an exemplary hardware diagram 400 for implementing the embodiments described above. For example, the exemplary hardware may be any of the provisioner, WB service, OEM, host, or SE. As shown, the device 400 includes a processor 420, memory 430, user interface 440, network interface 450, and storage 460 interconnected via one or more system buses 410. It will be understood that FIG. 4 constitutes, in some respects, an abstraction and that the actual organization of the components of the device 400 may be more complex than illustrated.

The processor 420 may be any hardware device capable of executing instructions stored in memory 430 or storage 460 or otherwise processing data. As such, the processor may include a microprocessor, field programmable gate array (FPGA), application-specific integrated circuit (ASIC), or other similar devices.

The memory 430 may include various memories such as, for example L1, L2, or L3 cache or system memory. As such, the memory 430 may include static random-access memory (SRAM), dynamic RAM (DRAM), flash memory, read only memory (ROM), or other similar memory devices.

The user interface 440 may include one or more devices for enabling communication with a user such as an administrator. For example, the user interface 440 may include a display, a mouse, and a keyboard for receiving user commands. In some embodiments, the user interface 440 may include a command line interface or graphical user interface that may be presented to a remote terminal via the network interface 450. In some embodiments, no user interface may be present.

The network interface 450 may include one or more devices for enabling communication with other hardware devices. For example, the network interface 450 may include a network interface card (NIC) configured to communicate according to the Ethernet protocol. Additionally, the network interface 450 may implement a TCP/IP stack for communication according to the TCP/IP protocols. Various alternative or additional hardware or configurations for the network interface 450 will be apparent.

The storage 460 may include one or more machine-readable storage media such as read-only memory (ROM), random-access memory (RAM), magnetic disk storage media, optical storage media, flash-memory devices, or similar storage media. In various embodiments, the storage 460 may store instructions for execution by the processor 420 or data upon with the processor 420 may operate. For example, the storage 460 may store a base operating system 461 for controlling various basic operations of the hardware 400. Further, software for carrying out the functions of the provisioner, WB service, OEM, host, or SE 462, may be stored in the memory. This software may implement the various embodiments described above.

It will be apparent that various information described as stored in the storage 460 may be additionally or alternatively stored in the memory 430. In this respect, the memory 430 may also be considered to constitute a "storage device" and the storage 460 may be considered a "memory." Various other arrangements will be apparent. Further, the memory 430 and storage 460 may both be considered to be "non-transitory machine-readable media." As used herein, the term "non-transitory" will be understood to exclude transitory signals but to include all forms of storage, including both volatile and non-volatile memories.

While the host device 400 is shown as including one of each described component, the various components may be duplicated in various embodiments. For example, the processor 420 may include multiple microprocessors that are configured to independently execute the methods described herein or are configured to perform steps or subroutines of the methods described herein such that the multiple processors cooperate to achieve the functionality described herein. Further, where the device 400 is implemented in a cloud computing system, the various hardware components may belong to separate physical systems. For example, the processor 420 may include a first processor in a first server and a second processor in a second server.

The embodiments described in FIG. 4 may also be implemented completely in hardware, completely in software such as described in FIG. 4, or a combination of both hardware and software.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of generating a shared secret for use in a symmetric cipher, comprising:

randomly selecting, by a processor, a valued $c_3$;

receiving, by the processor, a white-box implementation of the symmetric cipher configured to encrypt data using an encoded symmetric key Enc(K) to produce the same encrypted output as the symmetric cipher using the symmetric key K;

receiving, by the processor, a white-box implementation $f'(K, c_3)$ of a function $f(K, c_3)$ wherein $f(K, c_3)$ calculates a new shared key K' and $f'(K, c_3)$ calculates an encoded new shared key enc(K');

calculating the encoded new shared key as enc(K')=$f'(K, c_3)$;

transmitting, by the processor, $c_3$ to another device; and encrypting data, by the processor, using the encoded new shared key enc(K') and the white-box implementation; and transmitting, by the processor, the encrypted data to the other device.

2. The method of claim 1, wherein the other device is a secure element.

3. The method of claim 1, wherein the function $f(K, c_3)$ is a hash function.

4. The method of claim 1, wherein the white-box implementation of the symmetric cipher and a white-box implementation $f'(K, c_3)$ of the function $f(K, c_3)$ is received from an original equipment manufacturer.

5. The method of claim 1, wherein the white-box implementation of the symmetric cipher and the white-box implementation $f'(K, c_3)$ of the function $f(K, c_3)$ is produced by a white-box service that receives an unencoded copy of the key K.

* * * * *